US012620704B2

(12) United States Patent
(10) Patent No.: US 12,620,704 B2
(45) Date of Patent: May 5, 2026

Meshram et al.

(54) GEARED DRIVER MECHANISM FOR A COMPACT ANTENNA PHASE SHIFTER

(71) Applicant: John Mezzalingua Associates, LLC, Liverpool, NY (US)

(72) Inventors: Nikhil Meshram, Southampton, MA (US); Charles Buondelmonte, Baldwinsville, NY (US)

(73) Assignee: John Mezzalingua Associates, LLC, Liverpool, NY (US)

(*) Notice: Subject to any disclaimer, the term of this patent is extended or adjusted under 35 U.S.C. 154(b) by 225 days.

(21) Appl. No.: 18/272,954

(22) PCT Filed: Jan. 19, 2022

(86) PCT No.: PCT/US2022/012851

§ 371 (c)(1),
(2) Date: Jul. 18, 2023

(87) PCT Pub. No.: WO2022/159411

PCT Pub. Date: Jul. 28, 2022

(65) Prior Publication Data

US 2024/0088557 A1 Mar. 14, 2024

Related U.S. Application Data

(60) Provisional application No. 63/139,050, filed on Jan. 19, 2021.

(51) Int. Cl.
*H01Q 3/32* (2006.01)
*H01P 1/18* (2006.01)

(52) U.S. Cl.
CPC *H01Q 3/32* (2013.01); *H01P 1/18* (2013.01)

(58) Field of Classification Search
CPC .. H01P 1/184; H01P 1/18; H01Q 3/26; H01Q 3/30; H01Q 3/32; H01Q 1/246
See application file for complete search history.

(56) References Cited

U.S. PATENT DOCUMENTS 7,170,466 B2 * 1/2007 Janoschka ............... H01P 1/184 343/882
7,298,233 B2 * 11/2007 Zimmerman .......... H01Q 1/246 342/372
(Continued)

FOREIGN PATENT DOCUMENTS

CN 111834706 A 10/2020
EP 3588670 A1 1/2020
(Continued)

OTHER PUBLICATIONS

Extended European Search Report in connection to Application No. 22743050.1, dated Dec. 2, 2024.
(Continued)

*Primary Examiner* — Peter M Bythrow
(74) *Attorney, Agent, or Firm* — Meunier Carlin & Curfman LLC

(57) ABSTRACT

Disclosed is a compact phase shifter board for an antenna. The phase shifter board has at least one drive shaft having a drive bracket. The drive bracket has two slots oriented perpendicularly to the drive shaft. Each slot configured to engage with a drive pin of a first geared wiper arm such that translation motion of the drive shaft causes the first geared wiper arms to rotate. Each geared wiper arm has a first gear that engages with a second gear of a second geared wiper arm. The first and second gears and configured so that any rotational motion of the first geared wiper arms causes the corresponding second geared wiper arm to rotate in conjunction.

7 Claims, 11 Drawing Sheets

(56) References Cited

U.S. PATENT DOCUMENTS

| | | | | |
|---|---|---|---|---|
| 7,358,922 | B2 * | 4/2008 | Le | H01Q 1/246 343/810 |
| 7,463,190 | B2 * | 12/2008 | Zimmerman | H01Q 3/32 333/156 |
| 10,424,839 | B2 * | 9/2019 | Li | H01Q 1/246 |
| 10,581,163 | B2 * | 3/2020 | Schmutzler | F16H 25/20 |
| 10,833,407 | B2 * | 11/2020 | Yang | H01Q 1/246 |
| 10,854,967 | B2 * | 12/2020 | Zimmerman | H01Q 1/246 |
| 2005/0046514 | A1 * | 3/2005 | Janoschka | H01P 1/184 333/156 |
| 2006/0077098 | A1 * | 4/2006 | Zimmerman | H01Q 3/32 342/372 |
| 2011/0267231 | A1 * | 11/2011 | Le | F16H 37/04 342/359 |
| 2018/0287255 | A1 * | 10/2018 | Zimmerman | H01Q 3/08 |
| 2020/0006848 | A1 * | 1/2020 | Ding | H01P 1/184 |
| 2020/0321697 | A1 * | 10/2020 | Zimmerman | H01Q 21/26 |
| 2022/0006167 | A1 * | 1/2022 | P | H01Q 21/08 |

FOREIGN PATENT DOCUMENTS

| | | | |
|---|---|---|---|
| KR | 1020130112152 | A | 10/2013 |
| WO | 2019/209815 | A1 | 10/2019 |

OTHER PUBLICATIONS

International Search Report and Written Opinion, dated May 4, 2022, received in connection with corresponding International Patent Application No. PCT/US2022/012851.

* cited by examiner

GEARED DRIVER MECHANISM FOR A COMPACT ANTENNA PHASE SHIFTER

This application is a U.S. National Stage application filed under 35 U.S.C. § 371 of PCT/US2022/012851 filed Jan. 19, 2022, which claims the benefit of priority to U.S. Provisional Application No. 63/139,050 filed Jan. 19, 2021, each of which is hereby incorporated herein by reference in its entirety.

BACKGROUND OF THE INVENTION

Field of the Invention

The present invention relates to wireless communications, and more particularly, compact antennas having internal phase shifters.

Related Art

Advances in cellular wireless communications has driven demand for more complex antennas. For example, the advent of 5G, massive MIMO (Multiple Input Multiple Output), and the introduction of new frequency bands (e.g., CBRS (Citizens Broadband Radio Service)) require that more antenna dipoles and dipole arrays be packed into a single antenna. Further, the introduction of new bands and new MIMO capabilities drive the need for more antenna ports in a given antenna. Conversely, there is a drive to reduce the size of a given antenna: to reduce wind loading, and to allow for deployment in dense urban environments.

One of the required features of modern cellular antennas is a RET (Remote Electrical Tilt) capability. Remote Electrical Tilt is the ability to tilt a given band's antenna gain pattern "up and down" along a vertical axis. Remote Electrical Tilt is performed by one or more phase shifters deployed within the antenna.

Given the increasingly demanding space and volume constraints, a considerable challenge has emerged to design a RET phase shifter that is compact yet has sufficient torque to drive the phase shifter's wiper mechanisms.

SUMMARY OF THE INVENTION

An aspect of the present disclosure involves an antenna phase shifter. The antenna phase shifter comprises a drive shaft having a drive bracket, the drive bracket having a first slot oriented perpendicularly to an axis defined by the drive shaft; a first geared wiper arm having a first gear and engagement arm with a first wiper pin disposed on a distal end of the engagement arm, the first wiper pin configured to engage with and translate within the slot; and a second geared wiper arm having a second gear, wherein the first gear and the second gear are configured to engage so that a lateral motion of the drive shaft causes the first geared wiper arm to rotate around a first pivot, which in turn causes the second geared wiper arm to rotate around a second pivot.

DESCRIPTION OF EXEMPLARY EMBODIMENTS

Figure 1A:
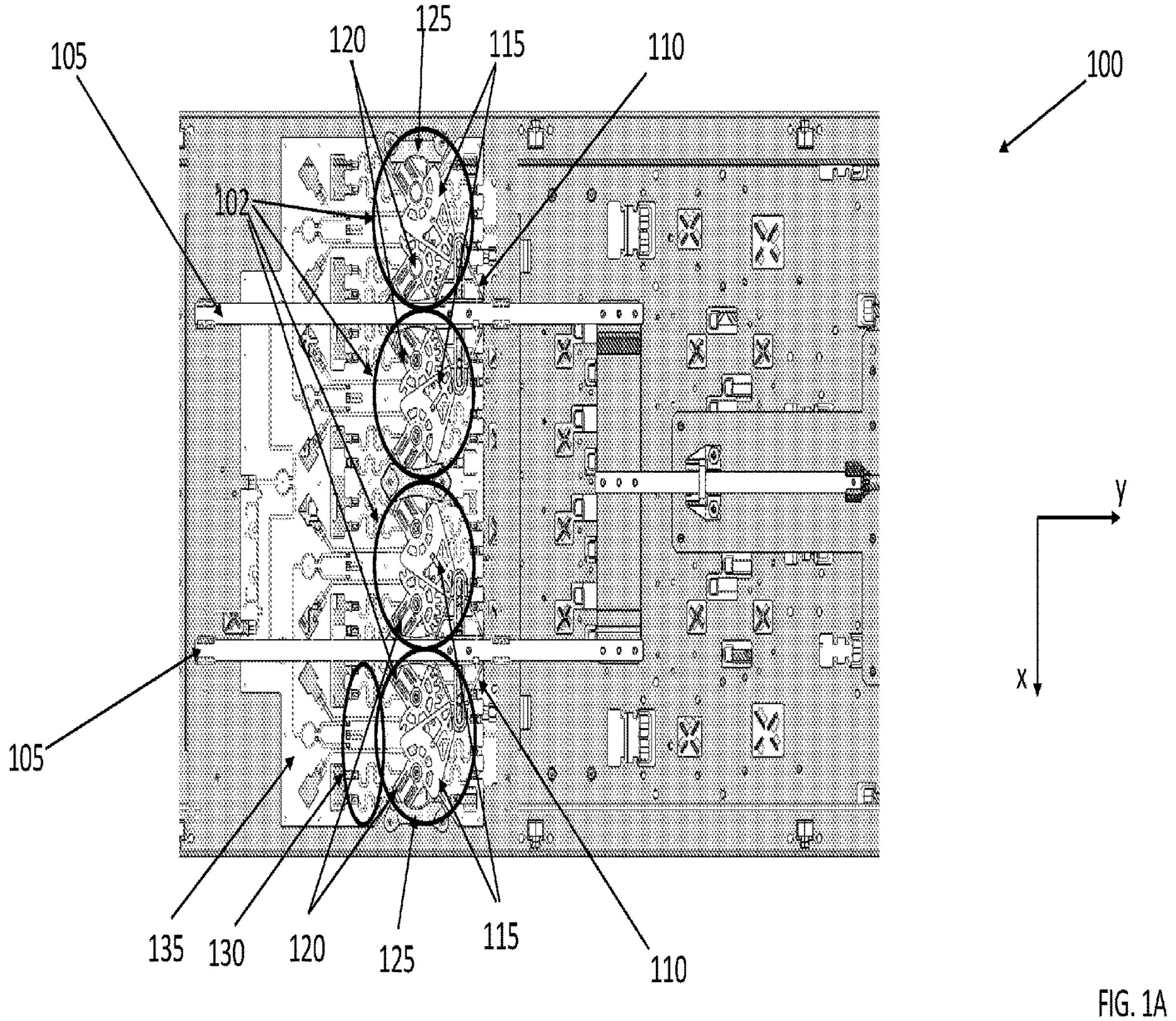
FIG. 1A illustrates an exemplary phase shifter and calibration board according to the disclosure.
Figure 1B:
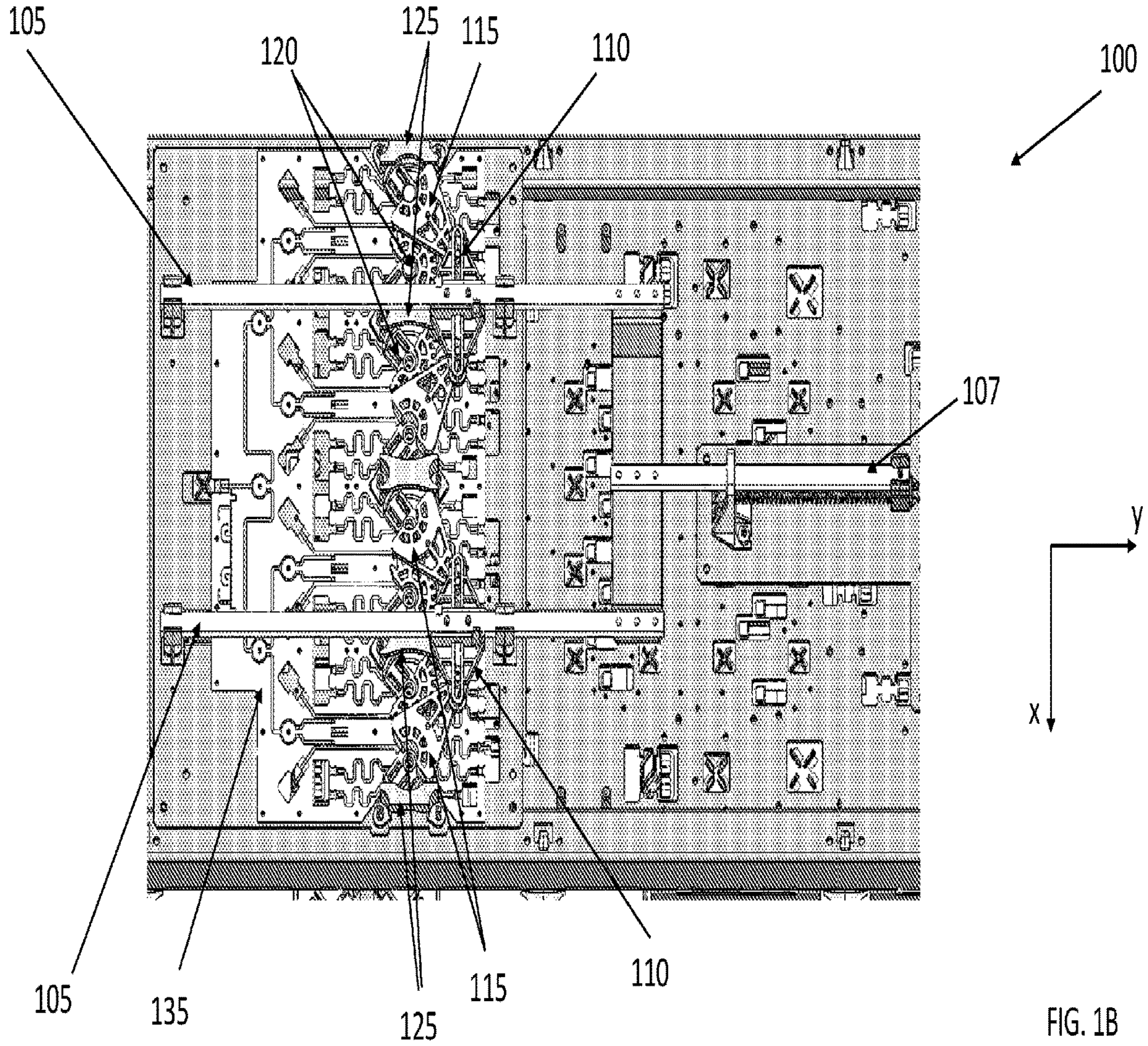
FIG. 1B is an ortho view of the exemplary phase shifter and calibration board of FIG. 1A.

FIGS. 1A and 1B illustrate an exemplary phase shifter and calibration board 100 according to the disclosure (hereinafter "phase shifter board 100"). Phase shifter board 100 has four phase shifters 102 wherein a given pair of phase shifters 102 shares a drive shaft 105. Each drive shaft has a drive bracket 110, each having two slots that engage a pin disposed on a corresponding first geared wiper arm 115. Each first geared wiper arm 115 is mechanically coupled to a second geared wiper arm 120. Both the first geared wiper arm 115 and second geared wiper arm 120 are mechanically held in electrically conductive contact with their corresponding conductive traces 130 by a contact bracket 125 that provides a downward pressure on either geared wiper arm 115/120.

Figure 2A:
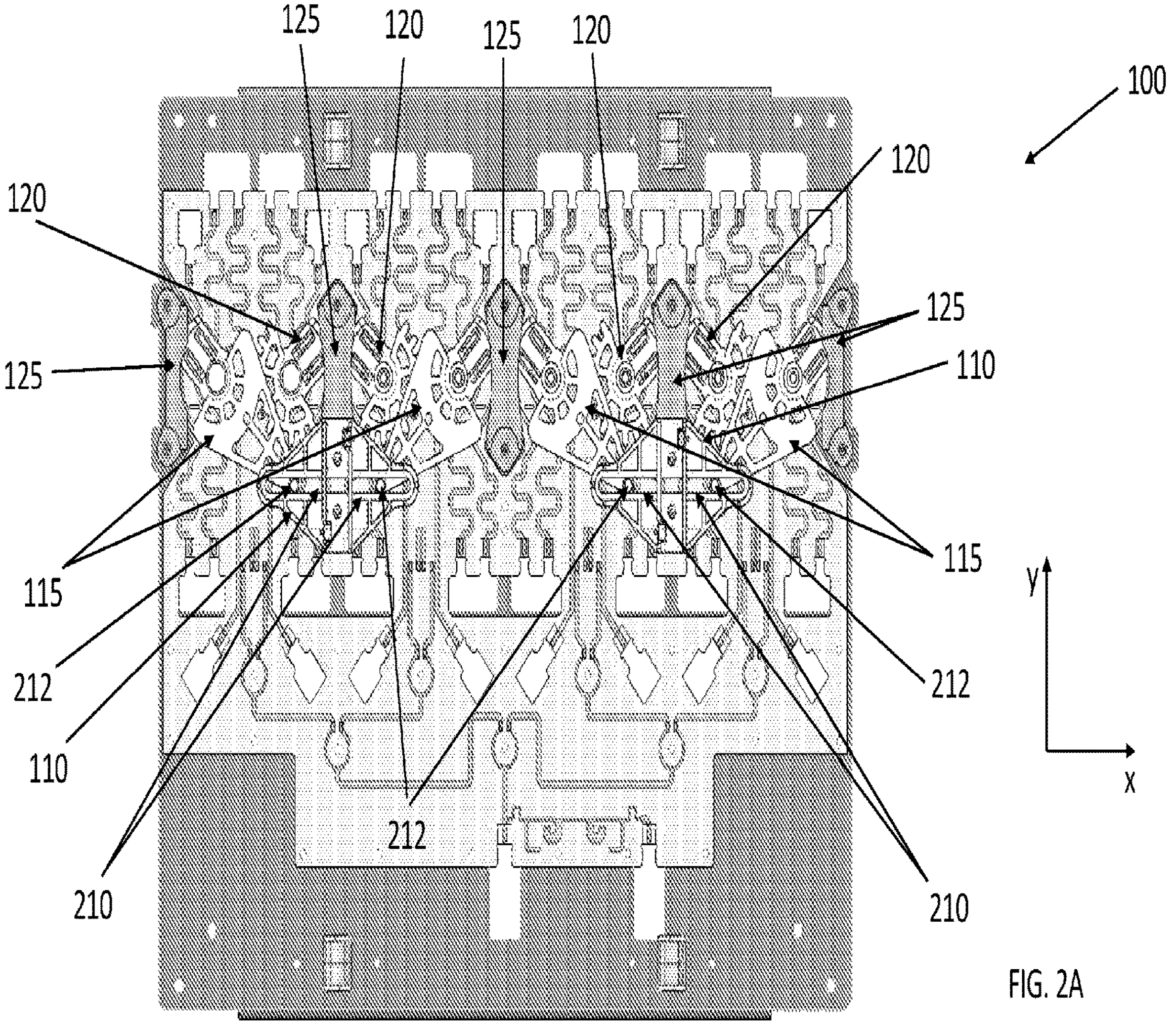
FIG. 2A illustrates an exemplary phase shifter wiper mechanism with the drive shaft removed from the drawing to provide a better view of the underlying mechanism. In this drawing, the phase shifter mechanism has its wipers set at a first end of the extent of its motion.
Figure 2B:
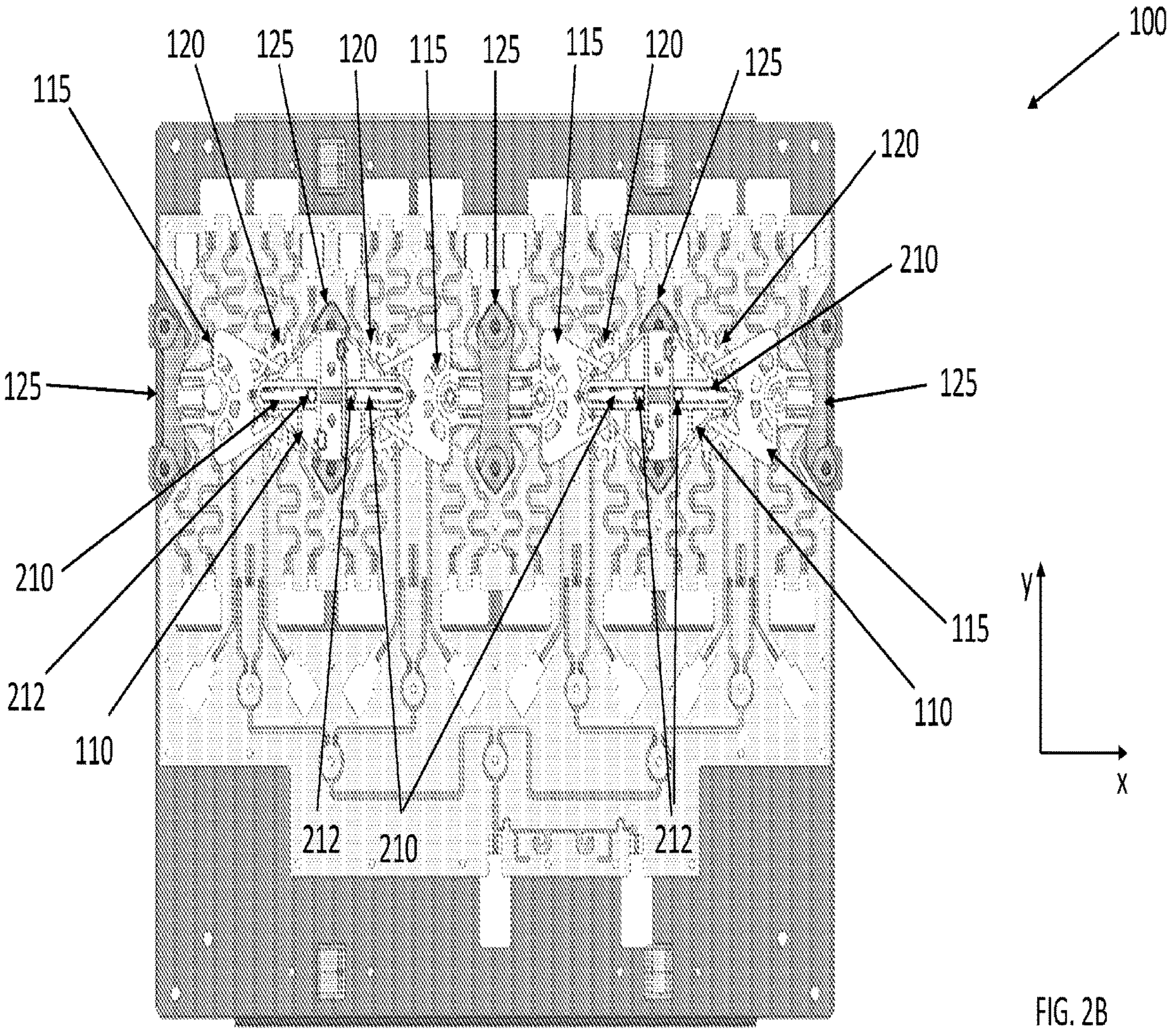
FIG. 2B illustrates the phase shifter wiper mechanism of FIG. 2A, but at its center or neutral position.
Figure 2C:
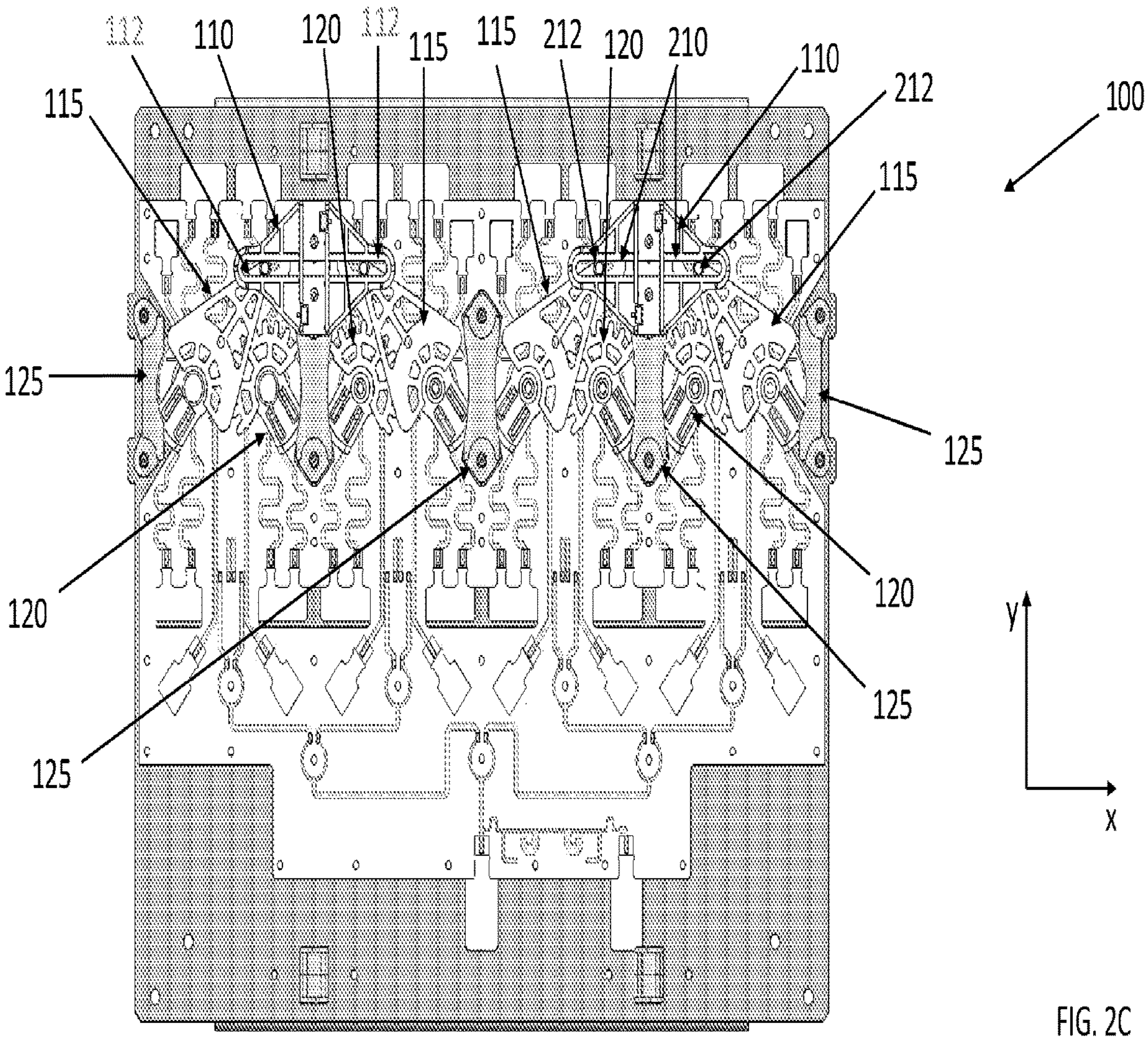
FIG. 2C illustrates the phase shifter wiper mechanism of FIGS. 2A and 2B, but set at a second end of the extent of its motion, which is the opposite end of the first end illustrated in FIG. 2A.

FIGS. 2A, 2B, and 2C respectively illustrate the phase shifters 102 at a first extent of motion, a central or neutral position, and a second extent of motion.

FIG. 2A illustrates an exemplary phase shifter wiper mechanism with the drive shafts 105 removed from the drawing to provide a better view of the underlying mechanism. In this drawing, the phase shifters 102 have their respective first geared wiper arms 115 and second geared wiper arms 120 at a first end of the extent of its motion. In this example, the first end of the extent of motion is the negative y-axis (or "downward") direction.

As illustrated, the two drive brackets 110 are in their lowest positions along the y-axis. Each drive bracket 110 has a pair of slots 210, within which a wiper arm pin 212 (coupled to or disposed on a corresponding first geared wiper arm 115) engages such that the wiper arm pin 212 may translate laterally along the x-axis within slot 210 as drive bracket 110 translates up and down along the y-axis.

FIG. 2B illustrates the phase shifters 102 in a central or neutral position. As illustrated, relative to the configuration in FIG. 2A, the two drive brackets 110 are translated along the positive y-axis (or "upward") direction until they reach the illustrated neutral position. Accordingly, each drive bracket engages with its corresponding wiper arm pins 212 as it translates, causing each wiper arm pin 212 to translate upward along the y-axis in conjunction as well as translate laterally along the x-axis within slot 210. In this case, each wiper arm pin 212 translates along the x-axis within its corresponding slot 210 so that it approaches its corresponding drive shaft (not shown). The translation of wiper arm pin 212, along both the x-axis and y-axis, imparts a rotation of corresponding first geared wiper arm 115, causing the wiper arm to change its position along its corresponding conductive traces 130, thereby changing the relative phases of the coupled signals. Given that first geared wiper arm 115 is mechanically coupled to second geared wiper arm 120 by their respective gears, each second geared wiper arm 120 rotates in conjunction with its respective first geared wiper arm 115, changing its position along its conductive traces 130, thereby changing the relative phases of its coupled signals in a conjugate manner to that of the first geared wiper arm 115.

FIG. 2C illustrates the phase shifters 102 at a second extent of motion, in the positive y-axis direction. As illustrated, the drive shafts (not shown) translated upward along the y-axis. Accordingly, the two drive brackets 110 translate in the positive y-axis direction in conjunction. This motion causes the wiper arm pins 212 to translate in the positive y-axis direction as well as laterally in the x-direction within its respective slot 210. The motion of the wiper arm pins 212 imparts a rotation on its corresponding first geared wiper arm 115, which in turn, by nature of its geared coupling with its corresponding second geared wiper arm 120, causes the corresponding second geared wiper arm 120 to rotate in conjunction. The result of this collective motion is illustrated in FIG. 2C, in which each of the first and second geared wiper arms 115/120 are at the second extent of their motion.

Figure 2D:
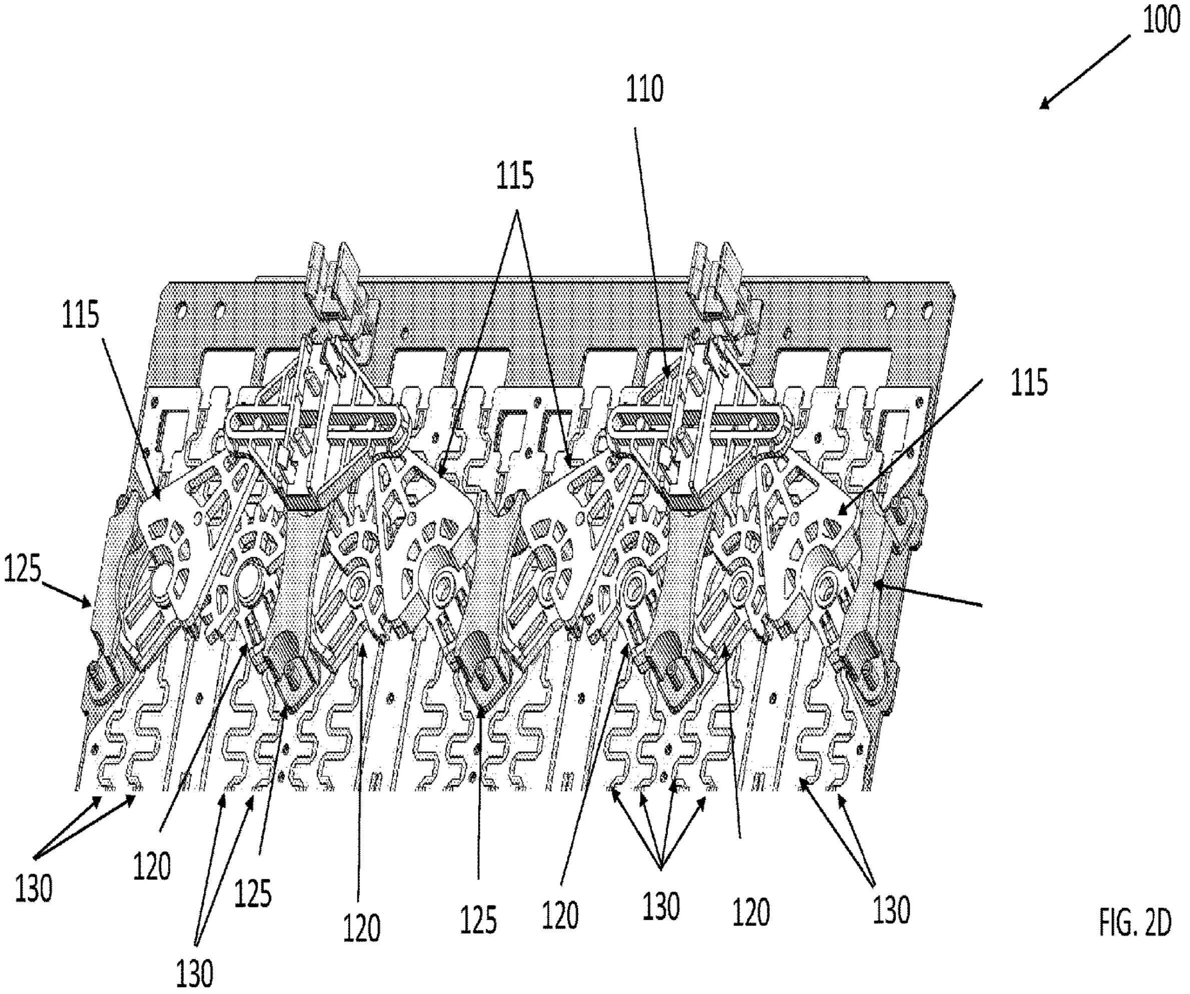
FIG. 2D is an ortho view of the phase shifter wiper mechanism set at the second end of the extent of its motion, as illustrated in FIG. 2C.

FIG. 2D is an ortho view of the phase shifter configuration of FIG. 2C, providing a better view of the physical engagement of the components discussed above.

Figure 3A:
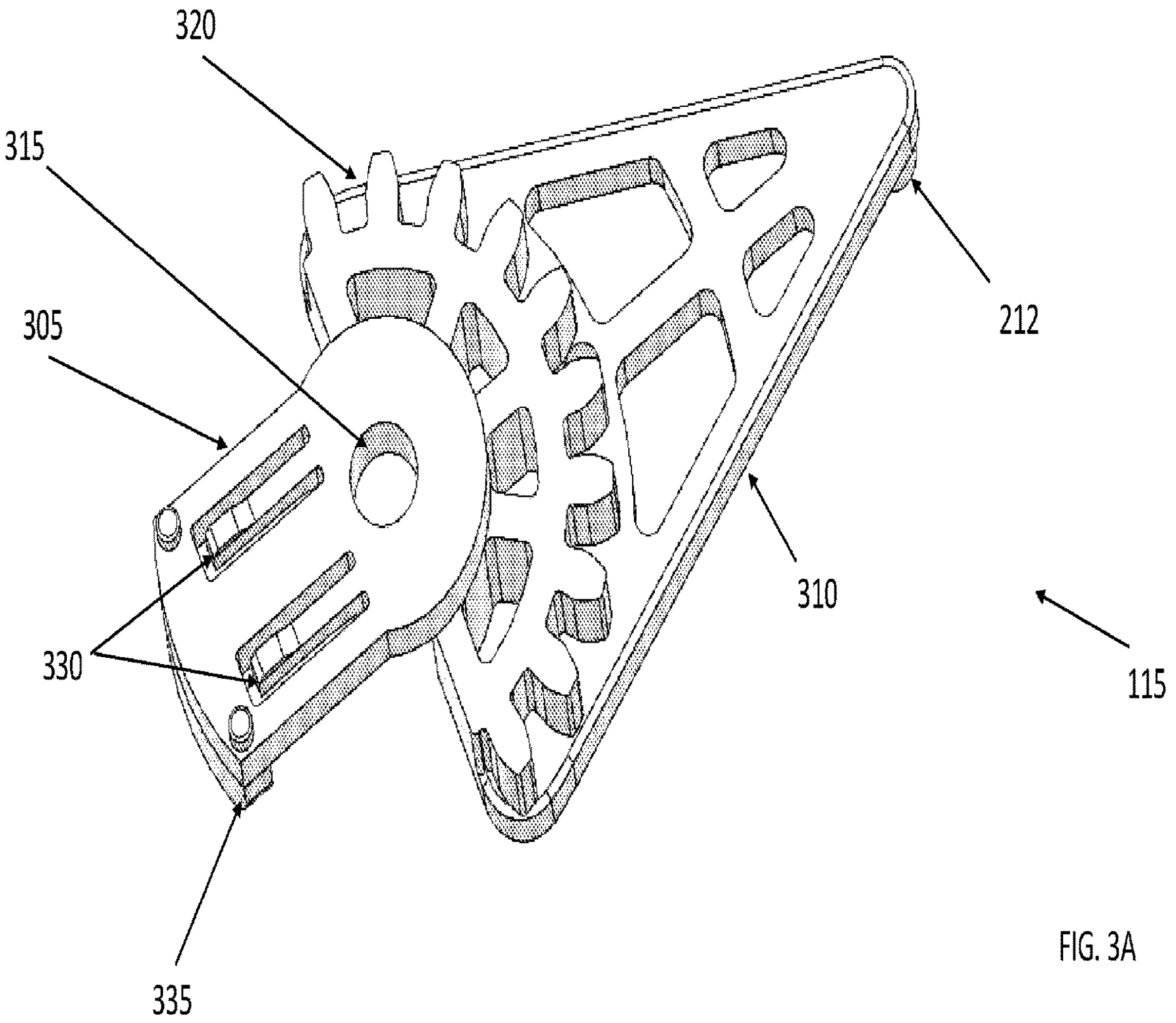
FIG. 3A illustrates an exemplary first geared wiper arm according to the disclosure.
Figure 3B:
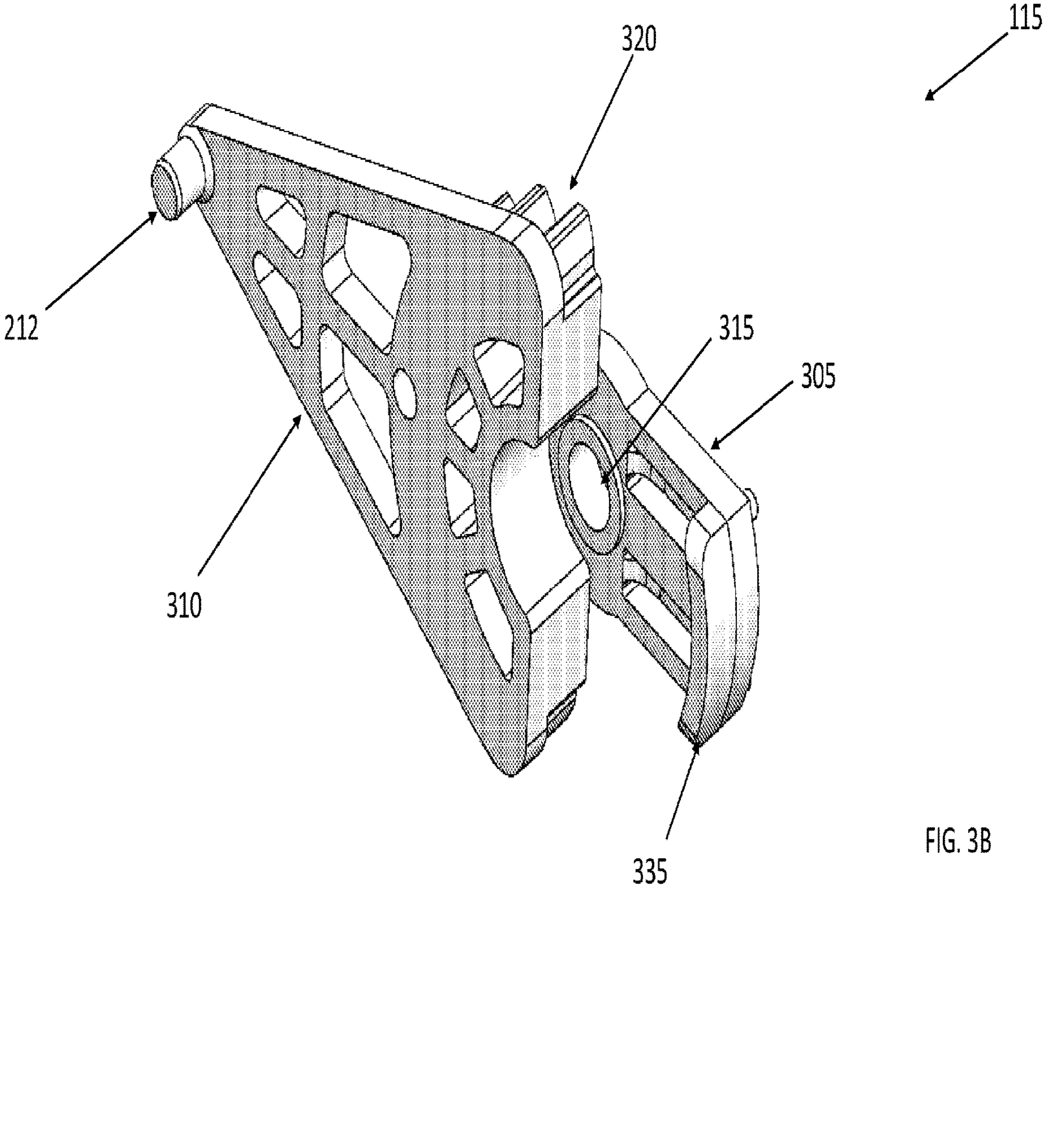
FIG. 3B is another view of the first geared wiper arm of FIG. 3A.

FIGS. 3A and 3B illustrate an exemplary first geared wiper arm 115 according to the disclosure. First wiper arm 115 has a drive shaft engagement arm 310 and a wiper pin 212 disposed on a distal end of the drive shaft engagement arm 310. The wiper pin 212 engages the slot 210 of drive bracket 110; a first gear 320, which engages the corresponding gear of second geared wiper arm 120; a first wiper arm 305 having a first pivot aperture 315, two contact fingers 330, and a pressure tab 335 disposed on the distal end of the first wiper arm 305. The first pressure tab 335 engages the underside of the corresponding contact bracket 125 to apply pressure to assure electrical contact between the wiper conductive trace (not shown) disposed on the second wiper arm 405 and its corresponding conductive traces 130.

Figure 4A:
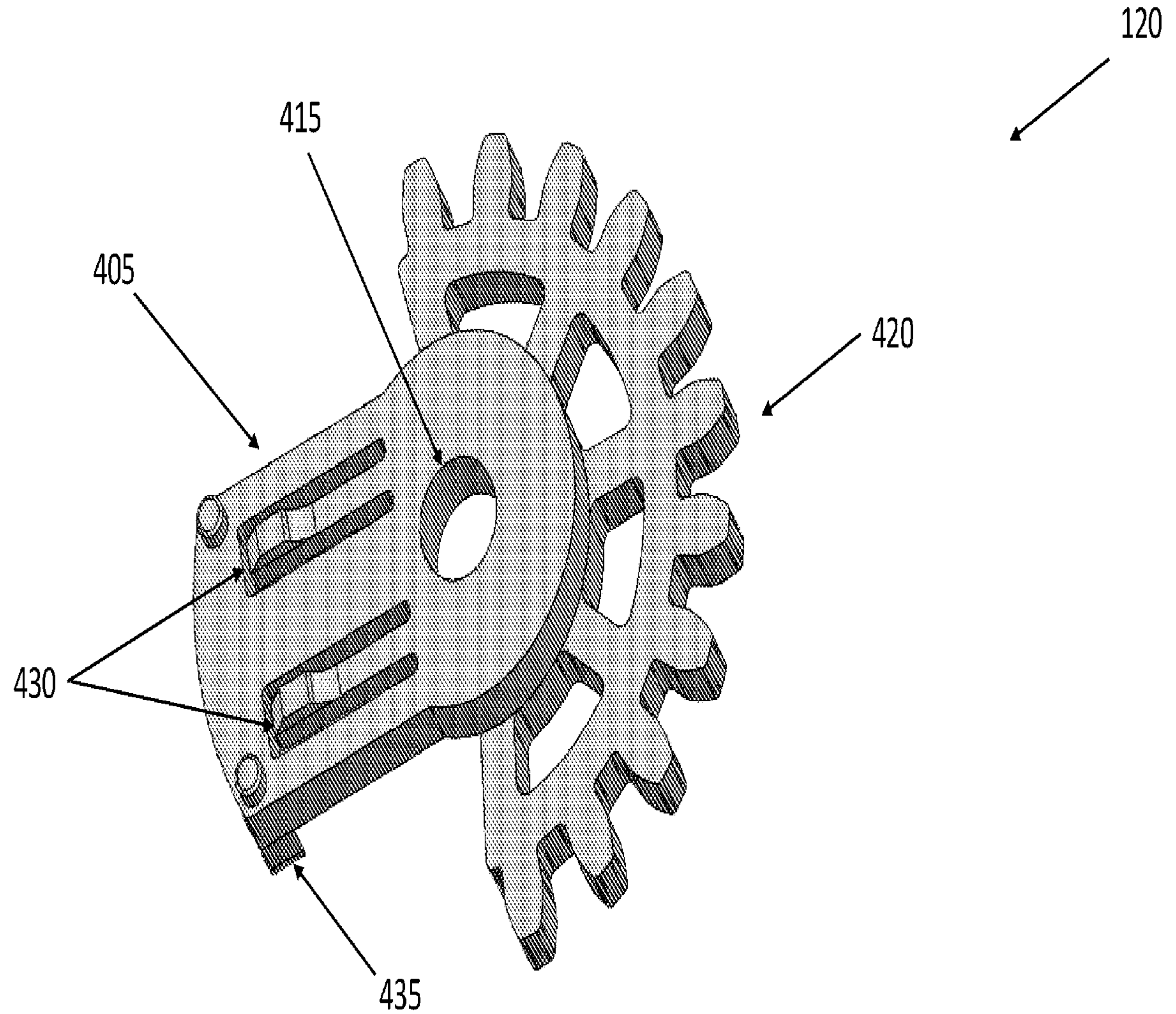
FIG. 4A illustrates an exemplary second geared wiper arm according to the disclosure.
Figure 4B:
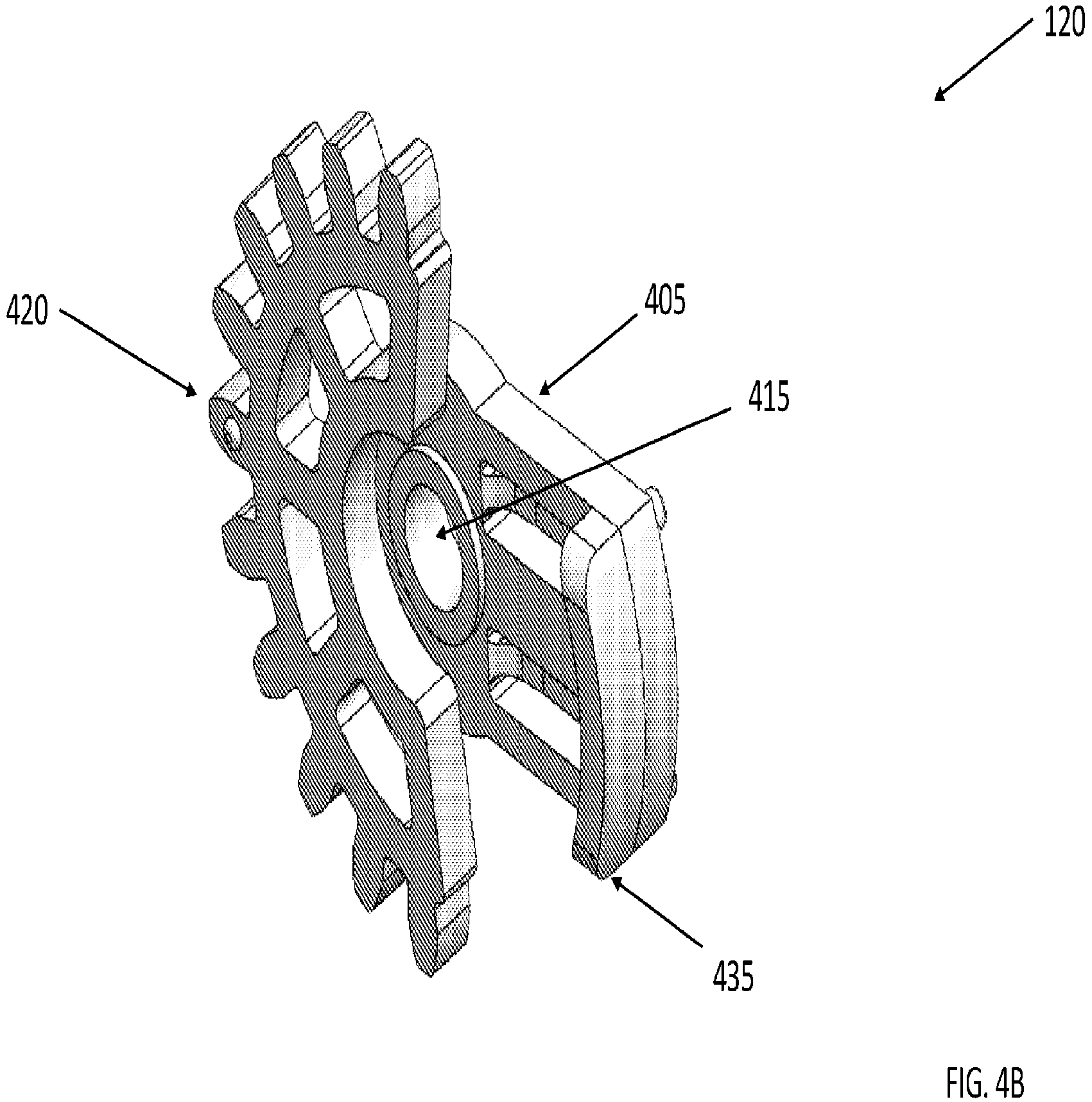
FIG. 4B is another view of the second geared wiper arm of FIG. 4A.

FIGS. 4A and 4B illustrate an exemplary second geared wiper arm 120 according to the disclosure. Second geared wiper arm 120 has a second gear 420 coupled to a second wiper arm 405. Second wiper arm 405 has a second pivot aperture 415, two contact fingers 330, and a pressure tab 435 disposed on the distal end of the second wiper arm 405. The pressure tab 435 engages with the underside of the corresponding contact bracket 125 to apply pressure to assure electrical contact between the wiper conductive trace (not shown) disposed on the second wiper arm 405 and its corresponding conductive traces 130.

First geared wiper arm 115 and second geared wiper arm 120 may be formed of a low friction plastic that provides strength and rigidity, such as Ultem 1000. This material may also be used for the contact fingers 330/430 in which it is important to provide appropriate pressure on the conductive traces 130. A separate low friction plastic may be used for the contact bracket 125, such as Delrin 500 or Delrin 500AF (Teflon filled). Not shown in FIG. 3A or 4A is a conductive trace disposed on wiper arm 305/405.

Figure 5:
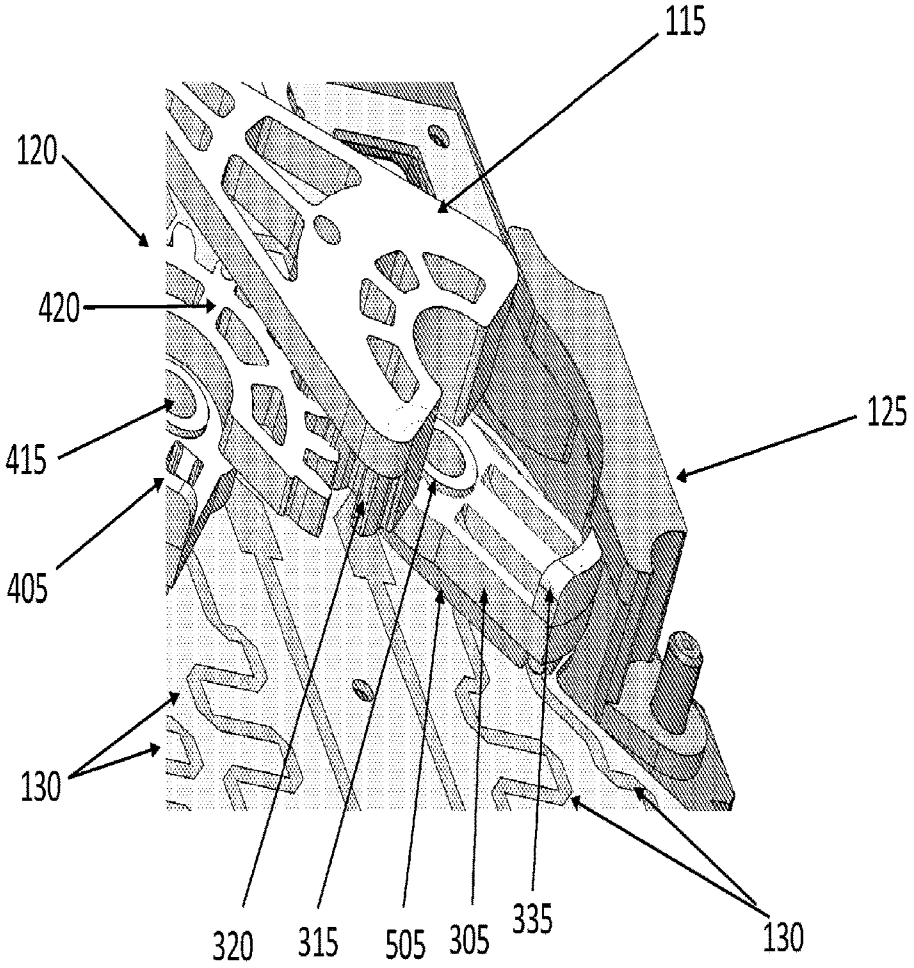
FIG. 5 illustrates an exemplary first wiper arm that is mechanically engaged with a corresponding second wiper arm and is held in place by a contact bracket.

FIG. 5 illustrates a first geared wiper arm 115 engaging with a second geared wiper arm 120 and located at a first or second extent of its motion. As illustrated, first geared wiper arm 115 is held in place with sufficient pressure being applied by contract bracket 125 and pressure tab 335. The wiper arm 305 of first geared wiper arm 115 has a wiper conductive trace 505 that makes electrical contact with conductive traces 130. As first geared wiper arm 115 rotates around first pivot 315 according to the mechanism described above with reference to FIGS. 2A-D, gear 320 of first geared wiper arm 115 engages with gear 420 of second geared wiper arm 120, causing second geared wiper arm 120 to rotate in conjunction around second pivot 415.

An advantage of the disclosed geared phase shifter wiper mechanism is that, although compact, the length of the drive shaft engagement arm 310 (in conjunction with the extent of travel enabled by slots 210) enable a greater torque to be applied to both first geared phase shifter arm 115 and second geared phase shifter arm 120 than would otherwise be possible with a conventional phase shifter drive mechanism.

The disclosed exemplary phase shifters 102 may be used for C-Band (3.7-4.2 GHz) or for Mid-band 1695-2180 MHz. However, variations may be made for other bands as well. It will be understood that such variations are possible and within the scope of the disclosure.

What is claimed is:

1. An antenna phase shifter, comprising:

a drive shaft having a drive bracket, the drive bracket having a first slot oriented perpendicularly to an axis defined by the drive shaft;

a first geared wiper arm having a first gear, an engagement arm with a first wiper pin disposed on a distal end of the engagement arm, and a contact finger configured to apply downward pressure on a wiper conductive trace, the first wiper pin configured to engage with and translate within the slot; and a second geared wiper arm having a second gear, wherein the first gear and the second gear are configured to engage so that a linear motion of the drive shaft along the axis causes the first geared wiper arm to rotate around a first pivot, which in turn causes the second geared wiper arm to rotate around a second pivot, and wherein the first pivot is positioned between the wiper pin and the contact finger.

2. The antenna phase shifter of claim 1, wherein the first geared wiper arm comprises a first wiper arm, wherein the first wiper arm comprises a first wiper conductive trace that is configured to make contact with a first plurality of conductive traces.

3. The antenna phase shifter of claim 2, wherein the second geared wiper arm comprises a second wiper arm, wherein the second wiper arm comprises a second wiper conductive trace that is configured to make contact with a second plurality of conductive traces.

4. The antenna phase shifter of claim 3, further comprising:

a first contact bracket configured to apply pressure to the first wiper arm to assure electrical contact between the first conductive wiper trace and the first plurality of conductive traces; and a second contact bracket configured to apply pressure to the second wiper arm to assure electrical contact between the second conductive wiper trace and the second plurality of conductive traces.

5. The antenna phase shifter of claim 4, wherein the first wiper arm comprises a first pressure tab disposed on its distal end, the first pressure tab configured to engage an underside of the first contact bracket, and wherein the second wiper arm comprises a second pressure tab disposed on its distal end, the second pressure tab configured to engage an underside of the second contact bracket.

6. The antenna phase shifter of claim 3, wherein the second wiper arm comprises two or more second contact fingers configured to apply a second downward pressure on the second wiper conductive trace.

7. The antenna phase shifter of claim 1, wherein the drive bracket comprises a second slot disposed on an opposite side of the drive shaft relative to the first slot.

* * * * *